United States Patent
Sumi et al.

(10) Patent No.: US 8,207,266 B2
(45) Date of Patent: Jun. 26, 2012

(54) PROPYLENE RESIN COMPOSITION, BLOW MOLDED PANEL COMPRISED OF THE COMPOSITION, AND AUTOMOBILE DECK BOARD COMPRISED OF THE BLOW MOLDED PANEL

(75) Inventors: Takehiko Sumi, Ebina (JP); Hideo Watanabe, Tokyo (JP)

(73) Assignee: Kyoraku Co., Ltd., Tokyo (JP)

( * ) Notice: Subject to any disclaimer, the term of this patent is extended or adjusted under 35 U.S.C. 154(b) by 0 days.

(21) Appl. No.: 11/680,002

(22) Filed: Feb. 28, 2007

(65) Prior Publication Data

US 2007/0203300 A1    Aug. 30, 2007

(30) Foreign Application Priority Data

Feb. 28, 2006   (JP) .................................. 2006-54175

(51) Int. Cl.
  *C08L 23/06*  (2006.01)
  *C08L 23/12*  (2006.01)
  *C08L 53/00*  (2006.01)

(52) U.S. Cl. ........................... 525/88; 525/240; 428/500

(58) Field of Classification Search .................... 525/88, 525/240; 428/500
  See application file for complete search history.

(56) References Cited

U.S. PATENT DOCUMENTS

| | | | | |
|---|---|---|---|---|
| 4,960,823 | A | * | 10/1990 | Komatsu et al. ................. 525/89 |
| 5,219,913 | A | * | 6/1993 | Tomomatsu et al. .......... 524/451 |
| 2002/0160908 | A1 | * | 10/2002 | Mink et al. ...................... 502/117 |

FOREIGN PATENT DOCUMENTS

| | | |
|---|---|---|
| JP | 62-280252 | 12/1987 |
| JP | 03-197541 | 8/1991 |
| JP | 08-208912 | 8/1996 |
| JP | 10235720 | 9/1998 |
| JP | 2003291935 | 10/2003 |
| WO | 9406859 | 3/1994 |
| WO | 9719135 | 5/1997 |

OTHER PUBLICATIONS

Machine translation of JP 08-208912.*
Machine translation of JP 10-235720.*
Ueki, Tohoru, "Molding Technique and Applications of Various Materials", Blow Molding Technique (The 3rd), Oct. 1984, pp. 1-8, Plastic Age Co., Ltd.
Hoechst, "Hoechst Plastics Hostalen PP", Plastics Data Handbook, 1973, p. 19.
Masuoka, Shiro; "Relaxation Phenomena in Polymers", 1992, 1 page.

* cited by examiner

*Primary Examiner* — Jeffrey Mullis
(74) *Attorney, Agent, or Firm* — Maine Cernota & Rardin

(57) ABSTRACT

A resin composition for blow molding is provided, made by formulating 0 to 30 weight parts of an inorganic filler based on 100 weight parts of a resin composition having of: 20 to 95% by weight of polypropylene resin having a melting point evaluated by a differential scanning calorimeter (DSC) of 160° C. or higher, the polypropylene resin being formulated of a propylene-ethylene block copolymer having an ethylene content of 3 to 15% by weight; and 5 to 80% by weight of polyethylene resin having a melting point evaluated by a differential scanning calorimeter (DSC) of 130° C. or higher, and a tensile break strength is 250 Kg/cm$^3$ or more at ambient temperature, and a tensile break elongation is 500% or more.

12 Claims, 5 Drawing Sheets

PROPYLENE RESIN COMPOSITION, BLOW MOLDED PANEL COMPRISED OF THE COMPOSITION, AND AUTOMOBILE DECK BOARD COMPRISED OF THE BLOW MOLDED PANEL

RELATED APPLICATIONS

This application claims priority from Japanese Patent Application No. 2006-54175, filed 28 Feb. 2006. This application is herein incorporated in its entirety by reference.

FIELD OF THE INVENTION

The present invention relates to a propylene resin composition and a blow molded panel comprised of the composition, and more particularly, to a propylene resin composition that is excellent in rigidity, impact resistance and blow molding properties as well as drop impact properties at low temperatures; a blow molded panel comprised of the composition; and an automobile deck board comprised of the blow molded panel.

BACKGROUND OF THE INVENTION

Polypropylene resins are relatively inexpensive and excellent in various physical properties, and thus are used in a variety of molded articles today. They are used in a wide range of fields, for example, including (1) injection molded articles such as caps, (2) extrusion molded articles such as sheets, and (3) blow molded articles such as ducts.

A variety of polypropylene resins are employed according to characteristics required for respective product applications and molding applications. The examples include (1) propylene homopolymers, (2) copolymers of propylene and α-olefins (particularly ethylene), and (3) blends of these (1) and (2).

On the other hand, means for meeting characteristics required for product applications and molding applications include (1) a method of altering various characteristics of polypropylene (polymer, copolymer, or a blend thereof) as mentioned above and (2) means by use of formulation ingredients (including a modifying agent and an additive with specific properties).

The present inventor has studied a propylene resin composition that is excellent in rigidity, impact resistance and blow molding properties as well as drop impact properties at low temperatures, and a blow molded panel comprised of the composition.

Polypropylene resin is frequently used for the flow molded panel as mentioned above because it satisfies rigidity and impact resistance required as a structure member and can be blow molded.

The blow molded panel as mentioned above is excellent in cold resistance impact strength as compared with a homopolymer and a random copolymer. A field requiring impact strength at −30° C. as well as heat resistance at 100° C. such as automobile parts uses a block copolymer produced by block copolymerizing 5 to 10 weight % of ethylene with propylene (see "Plastics Age" 2. Polypropylene, II. Molding Technique and Applications of Various Materials, Blow Molding Technique, published by Plastics Age Co., Ltd., October, 1984).

It is known that high density polyethylene is formulated with a polypropylene block copolymer or polypropylene homopolymer in order to improve blow molding properties (see Japanese Patent Application Publication (JP-B) Nos. 6-13625 and 6-80140).

JP-B-6-13625 describes a resin composition for blow molding in which talc is formulated for restraining the gloss of polypropylene resin (homopolymer or block copolymer) to obtain low gloss properties (surface deglazing) and high density polyethylene exhibiting a melt index within a specific range is formulated in order to improve gloss unevenness during talc formulation. Descriptions in JP-B-6-13625 are given from the viewpoint of obtaining low gloss properties with no gloss unevenness without describing what kind of high density polyethylene prevents blow molding properties. JP-B-6-13625 does not describe the improvement of propylene resin itself with blow molding properties or the improvement of high density polyethylene and blow molding properties or the improvement of impact resistance.

JP-B-6-80140 specifies the relationship of melt flow rates between a polypropylene block copolymer and high density polyethylene to be formulated therewith in order to improve gloss properties of the polypropylene block copolymer. The prior art of JP-B-6-80140 describes that a rubber material such as polyethylene, polyisobutylene or polybutadiene is sometimes added as means for improving the impact strength of polypropylene, particularly impact resistance at low temperatures, and that the addition generates a decrease in rigidity. Example 1 in JP-B-6-80140 describes that the drop impact strength at −30° C. is 18 kg/cm. However, test strips as a measurement target are injection molded articles, and the whole specification does not refer to blow molding properties.

Japanese Patent No. 3373516 (referred to as '516) relates to the impact improvement of a thermoplastic material. '516 describes a thermoplastic olefin polymer indicating a good low temperature impact performance by formulating a linear ethylene α-olefin polymer with polypropylene. Table 9 indicating evaluations of Examples lists Gardner drop impact strengths (m·kg) at −20° C., −30° C. and −40° C. The linear ethylene α-olefin polymer has a linear molecular structure and a narrow molecular weight distribution width, and thus is excellent in low temperature impact performance, whereas it tends to decreases in rigidity. The highest tensile elastic modulus (MPa) is 1556 in Table 15. This value is allowable for a structure; however, it is a value for an injection molding sample. Even in the whole specification of '516, blow molding properties are not depicted.

Japanese Patent No. 3470337 (referred to as '337) relates to a composition composed of a propylene homopolymer and propylene-ethylene copolymer. '337 describes an improvement in impact resistance at row temperatures. Tables 13 and 14 of Examples depict examples of hollow molded articles. However, the molded articles have a cornice structure with flexibility, and a propylene-ethylene copolymer is a random copolymer, and thus is not usable as a structure that requires rigidity.

Japanese Patent No. 2730879 (referred to as '879) relates to a resin composition for blow molding, produced by formulation of polypropylene resin (block copolymer or homopolymer), high density polyethylene and talc. The viscosity of high density polyethylene is set in a specified range so as not to spoil blow molding properties even if talc is formulated for the improvement of rigidity. A bumper beam of a molded article described in '879 has a bending elastic modulus of 18700 to 22100 kg/cm$^3$ according to the description of an Example and thus has rigidity as a structure. However, there is no description of low-temperature impact properties as a composition or molded article.

Japanese Patent Laid-Open (JP-A) No. 10-235720 relates to a blow molded surface panel for use in an automobile cargo floor panel and the like. In a structure as described in JP-A-

10-235720, a blow molded panel made of a propylene resin composition is not found, which is excellent in rigidity, impact resistance and blow molding properties as well as drop impact properties at low temperatures, and is balanced among a variety of characteristics. Thus, the development of a material that is more excellent in characteristics is desired.

JP-A-2003-291935 describes a multi-layered blow vessel comprised of a composition made by blending a propylene random copolymer and a propylene block copolymer, which is well balanced among heat resistance, impact resistance and transparency in order to meet impact resistance at low temperatures. In JP-A-2003-291935, the article is improved in impact resistance at low temperatures by formulation of a propylene block copolymer. However, a propylene random copolymer is present as a formulation component, and thus the vessel is unsuitable for applications that require rigidity.

Propylene-ethylene block copolymers are excellently balanced among rigidity, impact resistance and heat resistance. However, individual resin characteristics are desired to be further improved responding to performance improvement of each product. Measurements for required characteristics include improvements by means of molecular weight, molecular weight distribution, steric regularity, additive and the like. Among resin characteristics, further improvements are desired in impact resistance at low temperatures for automobile parts and the like. An improvement in impact resistance at low temperature would be considered by means of improvement of the molecular weight distribution and the like of polymer itself. However, for compensation, these pose the problem of destroying balances among various physical properties such as deterioration of blow molding properties.

Improvements in impact resistance at low temperatures by means of additive are known in many documents. It is useful to add a rubber material such as ethylene/propylene rubber. However, this measure presents a problem. In other words, it causes the problem of lowering rigidity by formulation. It is also known to blend an inorganic filler such as talc for the purpose of maintaining rigidity. However, mixing of talc could further worsen mechanical physical properties due to inhomogeneous dispersion. Mixing of talc in a larger amount tends to be a factor of inhibiting blow molding properties. For this reason, it is known to formulate high density polyethylene for improving blow molding properties. High density polyethylene is comparatively inexpensively available, so that formulation is useful and the formulation improves impact resistance and rigidity at room temperature. However, improvements in impact resistance and rigidity at low temperatures cannot be expected. That is, it is difficult to simultaneously achieve rigidity, impact resistance, cold resistance, heat resistance, and blow molding properties. Thus, a composition of meeting these properties is desired.

As discussed above, formulation of high density polyethylene improves blow molding properties of a polypropylene block copolymer to some extent. However, it is assumed to be difficult to attain various demand characteristics with good balance. For measures of these kinds, some proposals are made as described in the "Background Art"; however, these are not satisfied yet.

The present inventor carried out blow molding on a variety of materials of such conventionally known compositions of a polypropylene block copolymer and high density polyethylene and evaluated them. As a result, the inventor could find that it is difficult to obtain a molded article in which the rigidity and impact resistance are maintained at room temperature, the blow molding properties are improved, and further the impact resistance is maintained at a low temperature of about −30° C.

SUMMARY OF THE INVENTION

One embodiment of the present invention provides a blow molded panel in which the rigidity and impact resistance are maintained at room temperature, the blow molding properties are improved, and further the impact resistance is maintained at a low temperature of about −30° C. under specific conditions for polypropylene resin and high density polyethylene; and an automobile deck board constituted by the blow molded panel.

For the attainment of the above object, according to a first embodiment of the present invention, there is provided a resin composition for blow molding, the composition being made by formulating 0 to 30 weight parts of an inorganic filler based on 100 weight parts of a resin composition comprised of: 20 to 95% by weight of polypropylene resin having a melting point evaluated by a differential scanning calorimeter (DSC) of 160° C. or higher, the polypropylene resin being comprised of a propylene-ethylene block copolymer having an ethylene content of 3 to 15% by weight; and 5 to 80% by weight of polyethylene resin having a melting point evaluated by a differential scanning calorimeter (DSC) of 130° C. or higher, characterized in that the tensile break strength is 250 $Kg/cm^3$ or more at ambient temperature and the tensile break elongation is 500% or more.

According to a second embodiment of the present invention, there is provided a composition for blow molding, comprising: 20 to 95% by weight of polypropylene resin having a melting point evaluated by a differential scanning calorimeter (DSC) of 160° C. or higher, the polypropylene resin being comprised of a propylene-ethylene block copolymer having an ethylene content of 3 to 15% by weight; and 5 to 80% by weight of polyethylene resin having a melting point evaluated by a differential scanning calorimeter (DSC) of 130° C. or higher, characterized in that the tensile break strength is 250 $Kg/cm^3$ or more at ambient temperature and the tensile break elongation is 500% or more, and the composition is made by formulating 6 to 50 weight parts of an inorganic filler based on 100 weight parts of a resin composition having a tensile break elongation determined at −30° C. of 50% or more.

The resin composition for blow molding is characterized in that the tensile elongation measured and the tensile break elongation at −30° C. of the composition are 10% or more.

The resin composition for blow molding is characterized in that the tensile break elongation at −30° C. of the polypropylene resin is 50% or more.

The resin composition for blow molding is characterized in that, in the polypropylene resin, a ratio (MFR ratio) obtained by dividing a melt flow rate determined at a temperature of 190° C. under a load of 211.8N by a melt flow rate determined at a temperature of 190° C. under a load of 21.18N is 120 or less.

The resin composition for blow molding is characterized in that, in the polyethylene resin, a ratio (MFR ratio) obtained by dividing a melt flow rate determined at a temperature of 190° C. under a load of 211.8N by a melt flow rate determined at a temperature of 190° C. under a load of 21.18N is 80 or less.

Additionally, according to a third embodiment of the present invention, there is provided a blow molded panel constituted by the above composition as recited in the first or second embodiment.

According to a fourth embodiment of the present invention, there is provided a blow molded panel of a hollow double-walled structure, constituted by the resin composition as recited in the first or second embodiment.

According to a fifth embodiment of the present invention, there is provided a blow molded panel produced by melting, extruding, and blow molding the resin composition as recited in the first or second embodiment, the blow molded panel having a hollow double-walled structure produced by compression welding the peripherals of a pair of opposed and separated surface walls by means of a die, wherein at least one of the surface walls is protruded to the hollow space of the structure and the ribs are integrally molded.

According to a sixth embodiment of the present invention, there is provided an automobile deck board constituted by the blow molded panel of the hollow double-walled as recited in the fifth embodiment.

According to one embodiment of the present invention, there can be obtained a propylene resin composition that is excellent in rigidity, impact resistance and blow molding properties as well as drop impact properties at low temperatures, and a blow molded panel comprised of the composition.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
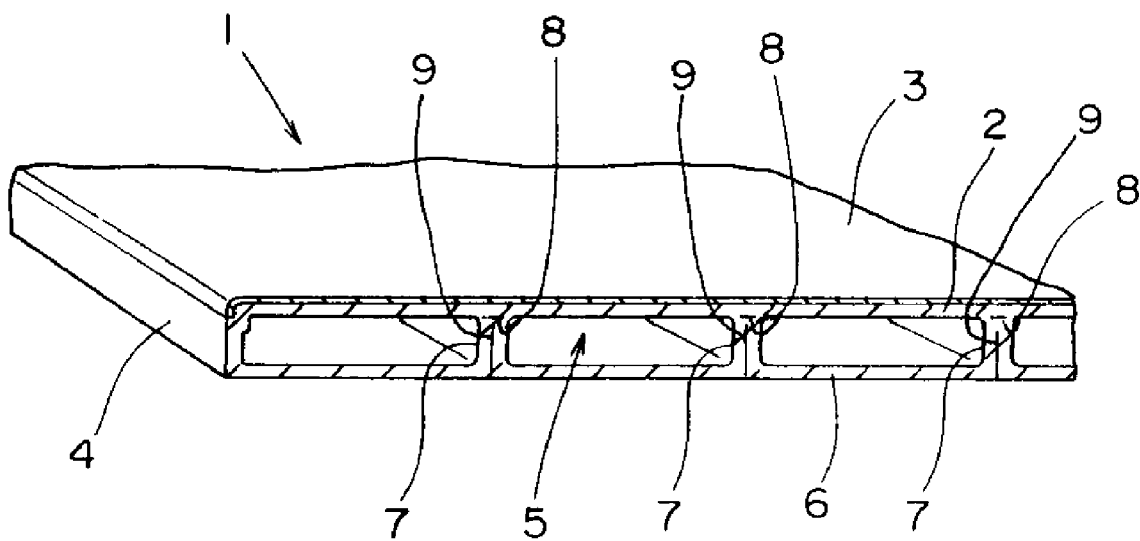
FIG. 1 is a partial perspective view indicating a panel with a cover as a blow molded panel according to one embodiment of the present invention.

Propylene resin for use in one embodiment of the present invention is a propylene-ethylene block copolymer having an ethylene content of 3 to 15% by weight. Ethylene resin for use in one embodiment of the present invention is high density polyethylene having a density of 0.935 g/cm$^3$ or more, preferably from 0.940 to 0.975 g/cm$^3$. If the density deviates from the above range, satisfied physical properties cannot be obtained.

A resin composition for blow molding of one embodiment of the present invention is a resin composition for blow molding, made by formulating 5 to 80 weight parts of ethylene resin based on 100 weight parts of propylene resin. The composition can be blended by means of a known method. For example, the composition can be melt blended by means of a single screw extruder, twin screw extruder, Brabender, Banbury mixer, kneader blender, or the like.

The composition of one embodiment of the present invention can be formulated a generally used additive, filler, and other resins without departing from the object of the invention. Additives that can be formulated include antioxidants, heat stabilizers, light stabilizers, weather resistant stabilizers, antistats, flame retardants, plasticizers, mold releases, foaming agents, lubricants, pigments, colorants, and ultraviolet absorbers. Fillers that can be formulated include talc, calcium carbonate, glass fibers, mica, and calcium silicate. Other resins that can be formulated include low density polyethylene, ethylene-α olefin copolymers, propylene random copolymers, and propylene homopolymers.

For the effectiveness of addition of polyethylene, (1) the addition of polyethylene to a blow molded article of polyethylene resin can improve the strength of pinch off. In particular, the improvement of the pinch off strength at low temperatures is large. (2) Recycling of scrap resin is used because the generation of a relative amount of fins cannot be avoided during blow molding. In general, polypropylene resin has a large decrease in molecular weight when subjected to kneading since it tends to thermally deteriorate. Hence, if polypropylene resin only is recycled, a decrease in molding processability causes a trouble in production. For the prevention of this, addition of polyethylene that hardly causes thermal deterioration can reduce a decrease in molding processability during recycling.

The evaluation of the polyethylene content involves producing a sheet by press molding of polypropylene resin at 210° C., taking infrared spectra, and then evaluating the ethylene content from the peak area in the range of 700 cm$^{-1}$ to 750 cm$^{-1}$ by means of a calibration curve prepared in advance. The ethylene content of a propylene-ethylene block copolymer of less than 3% is not preferred because the molded article is inferior in impact strength and the compatibility with polyethylene is not good. When the ethylene content exceeds 15%, the rigidity of the molded article is insufficient.

A melt flow rate (MFR) is determined at a temperature of 210° C. under a load of 21.18N in accordance with JIS K72104. MFR is a measure indicating flowability at the time of melt of resin and relates to moldability such as extrusion suitability.

An MFR ratio is a ratio obtained by dividing a melt flow rate determined at a temperature of 210° C. under a load of 211.8N by a melt flow rate determined at a temperature of 210° C. under a load of 21.18N. The MFR ratio rheologically indicates a degree of non-Newtonian fluid; the wider the molecular weight distribution, the larger the numerical value in general. Too large an MFR ratio decreases impact strength such as drop strength. Additionally, a decrease in the MFR ratio relatively reduces the amount of components of macromolecules. This may lead to a decrease in draw-down properties and ESCR as well as an increase in a motor load and a decrease in extrusion amount on account of an elevation in resin pressure at the screw of the extruder due to a decrease in the amount of components of low molecular-weight molecules, which is not preferred.

The MFR ratio narrows the molecular weight distribution and thus improves not only the tensile break elongation, but also impact properties. Consequently, a material having a small MFR ratio is preferred. Although a small MFR ratio leads to concerns over molding processability, molding processability is not lowered in a blend system of one embodiment of the present invention since the MFR ratio becomes large.

A melt tension (MT) refers to a fusion tension, is a measure indicating a tension at the time of the melt of resin, and is related to moldability such as draw down. Measurements were carried out by means of a melt tension tester available from Toyo Seiki Seisaku-Sho, Ltd. at a temperature of 210° C. at an extrusion speed of 10 mm/min and a take-up speed of 4 m/min, with an orifice diameter being 2.09 mm and the length being 8 mm in the nozzle part.

Melt tension viscosity (MTV) is an index of stringiness indicating ease of stringing of a polymer melt. In terms of solid-state physics in rheology, a polymer melt indicates intermediate characteristics between a viscous body and a rubber elastic body. As the numerical value of measurement of MTV is large, the string is unlikely to be cut, and thus is excellent in stringiness. The change of stringiness affects the mechanical strength of moldability and a molded article. Measurements were carried out by means of a melt tension tester available from Toyo Seiki Seisaku-Sho, Ltd. at a temperature of 210° C. at an extrusion speed of 10 mm/min and a take-up raising speed of 40 rpm/min, with an orifice diameter being 2.09 mm and the length being 8 mm in the nozzle part, and MTV was defined as a take-up speed when the melt resin was broken. Measurements were conducted until the number of revolutions of take-up became a maximum of 500 rpm (=78.5 m/min).

The melting point is evaluated by means of a differential scanning calorimeter (DSC). Measurements were carried out by means of a "DSC-50" (trade name, available from Shimadzu Corporation) using a 5 mg sample at a nitrogen flow rate of 30 ml/min and a temperature raising rate of 10° C./min, with the top of the maximum absorption peak defined as the melting point.

In one embodiment of the present invention, the tension break elongation, tension break strength, tensile yield strength and tensile elastic modulus were determined under testing conditions of high density polyethylene in accordance with JIS K 6760-1995 with the exception of the descriptions below. Test strips used in measurements were obtained in the following. That is, a panel molded by a resin composition for blow molding as illustrated in an experimental example was produced, and then allowed to stand at 25° C. for 7 days, and a portion of the wall face of the panel was cut out, and stamped into a dumb-bell shape stipulated in JIS No. 2 to fabricate a test trip, with the thickness of the test strip being 2.0 mm±0.5 mm.

The tensile break elongation is an elongation of a test strip at the moment of rupture of the test strip, and was calculated from inter-chuck distances at rupture. The tensile break elongation is related to characteristics of impact resistance of a product. In other words, a material of a small elongation tends to cause brittle fracture and is inferior in impact resistance. On the other hand, a material of a large elongation tends to ductilely break, and is excellent in impact resistance.

The tensile break strength is related to rigidity and load resistance of a product. The large numerical value means that rigidity and load resistance are excellent.

The tensile yield strength is related to toughness of a product. The large numerical value means that toughness is excellent.

The tensile elastic modulus is related to characteristics of rigidity of a product. The large numerical value means that rigidity is high.

Blow molding involves extruding thermoplastic resin in plasticization in a cylindrical or sheet form to form a pre-molded body, placing the pre-molded body in a die having therein a cavity, expansion transforming the pre-molded body by introduction of pressured fluid such as air to thereby mold the body in a cubic shape matched to the cavity in the die. Additionally, as means for molding the body in a cubic form, vacuum aspiration means in the side opposite to the side of the pre-molded on which the pressured fluid is introduced can also be used in combination with means for expansion transforming the pre-molded body by introduction of the pressured fluid. Moreover, the pre-molded body is not molded via a die immediately after the molding of pre-molded body, but the pre-molded body can be heated again to mold the body in a cubic form in the die when the pre-molded body is once cooled to be temporarily stored. Furthermore, a foamed resin core molded in advance is inserted into the blow molded shell body, to thereby obtain a double-walled structure in which a core is inner packaged or a double-walled structure in which a foamed resin core is poured into the inside of a blow molded hollow double-walled structure so that the core is inner packaged.

Requirements in blow molding properties include (1) that a high melt tension during plasticization fusion is maintained to thereby prevent the draw down of an extruded parison and the thickness of a finally molded product is uniformly maintained, (2) that high stretching properties during plasticization fusion are maintained to thereby well expansion transform a parison without generating pin holes when the parison is expanded via pressured fluid such as air introduced thereinto, and finally a product having a uniform thickness without pin holes or molding-failed portions is obtained, and (3) that weld strength of a pinch-off portion, in which a parison is pinched via a die and compressed and welded, is good.

Next, in the various embodiments of the present invention, values of the MFR, MFR ratio, ethylene content, MT, MTV, melting point, tensile break elongation, tensile break strength and tensile elastic modulus will be shown. PP refers to polypropylene resin, PE refers to polyethylene resin, and a composition refers to a resin composition for blow molding.

[MFR of Composition]

Preferably from 0.01 to 10

More preferably from 0.05 to 2

| | [MFR ratio] |
|---|---|
| PP | preferably 120 or less |
| PE | preferably 80 or less |
| Composition | preferably 70 or more |
| | more preferably 90 or more |

[Ethylene Content of PP]

more preferably 5% or more still more preferably 7% or more

When the ethylene content exceeds 15%, the rigidity of a molded article is insufficient.

| | [MT] |
|---|---|
| PP, PE | preferably 3 g or more |
| Composition | preferably 3 g or more, |
| | more preferably 5 g or more |

[MTV]

PP preferably 30 m/min or more

PE preferably 20 m/min or more

[Melting Point]

PP preferably 162° C. or more

PE preferably 133° C. or more

| [Tensile Break Elongation of Composition at −30° C.] | |
| --- | --- |
| When no filler is added or a few amount of filler is added, | |
| preferably | 100% |
| more preferably | 200% |
| When a filler of 6% by weight or more is added, | |
| preferably | 10% |
| more preferably | 15% |
| still more preferably | 20% |

| [Tensile Break Strength of Composition] | |
| --- | --- |
| preferably | 250 kgf/cm$^2$ or more |
| more preferably | 280 kgf/cm$^2$ or more |

| [Tensile Yield Strength of Composition] | |
| --- | --- |
| preferably | 200 kgf/cm$^2$ or more |

| [Tensile elastic modulus of Composition] | |
| --- | --- |
| When no filler is added or a few amount of filler is added, | |
| Preferably | 5000 kgf/cm$^2$ or more |
| Preferably | 7000 kgf/cm$^2$ or more |

Blow molded articles produced by one embodiment of the present invention include panels, housing members, tanks, ducts, bottles, and other articles.

A blow molded panel is a hollow double-walled structure or a platy structure of a single-walled structure. Examples include (1) members for use in the interior of an automobile, e.g., deck boards (such as floor lids and luggage boards), seat backs, door panels, and side housing covers, (2) members for used in housing of electronic (electric) apparatuses such as copying machines, e.g., doors of copying machines, and sorter covers, and (3) wall materials used in installed properties of a building, house and office, e.g., shelf boards, doors of toiletry stands, top boards of desks, and bath aprons of bathes.

One embodiment of the present invention will be explained in more detail by means of experimental examples indicated in Tables 1 to 6 hereinafter. Note that the present invention is by no means limited to the experimental examples below so long as departing from its scope.

Next, a panel made by sticking a cover material to the outer surface and a method of manufacturing the panel will be described. FIG. 1 illustrates a panel with a cover according to one embodiment of the present invention. Additionally, FIGS. 2 to 4 each indicate a blow molding aspect of the panel with the cover of FIG. 1.

In FIG. 1, reference numeral 1 is a panel with a cover, which is produced by blow molding thermoplastic plastics. The panel 1 with the cover has a hollow double-walled structure. On the outer surface of one wall 2 of the panel, a cover material 3 of cloth having fuzzy hairs or flocking outward is heat welded integrally by blow pressure during blow molding. Note that the cover material 3 covering the outer surface of the one wall 2 is made to hang on a peripheral wall 4 of the hollow double-walled structure. Reference numeral 5 is a hollow space. In the other wall 6 of the panel 1 with the cover is formed an inner rib 7 that is extended until a portion of the other wall 6 is in touch with the one wall 2. The inner rib 7 formed by extending the portion of the other wall 6 toward the one wall 2 causes its top end face 8 to touch with the other wall 2 to an extent of substantially not thrust the wall 2. However, the top end face 8 of the inner rib 7 is integrally welded to the one wall 2 by this thrust. Consequently, in the panel 1 of the hollow double-walled structure, the one wall 2 and the other wall 6 thereof are integrated via the inner rib 7, so that the panel is improved in rigidity and strength. The inner rib 7 is present between the one wall 2 and the other wall 6, and is a wall that is bridged across the hollow space 5 and integrally connected via a welded portion 9 of a side face. Since the inner rib 7 does not have a concave portion different from a general rib, both the one wall 2 and the other wall 6 are planar faces.

Figure 2:
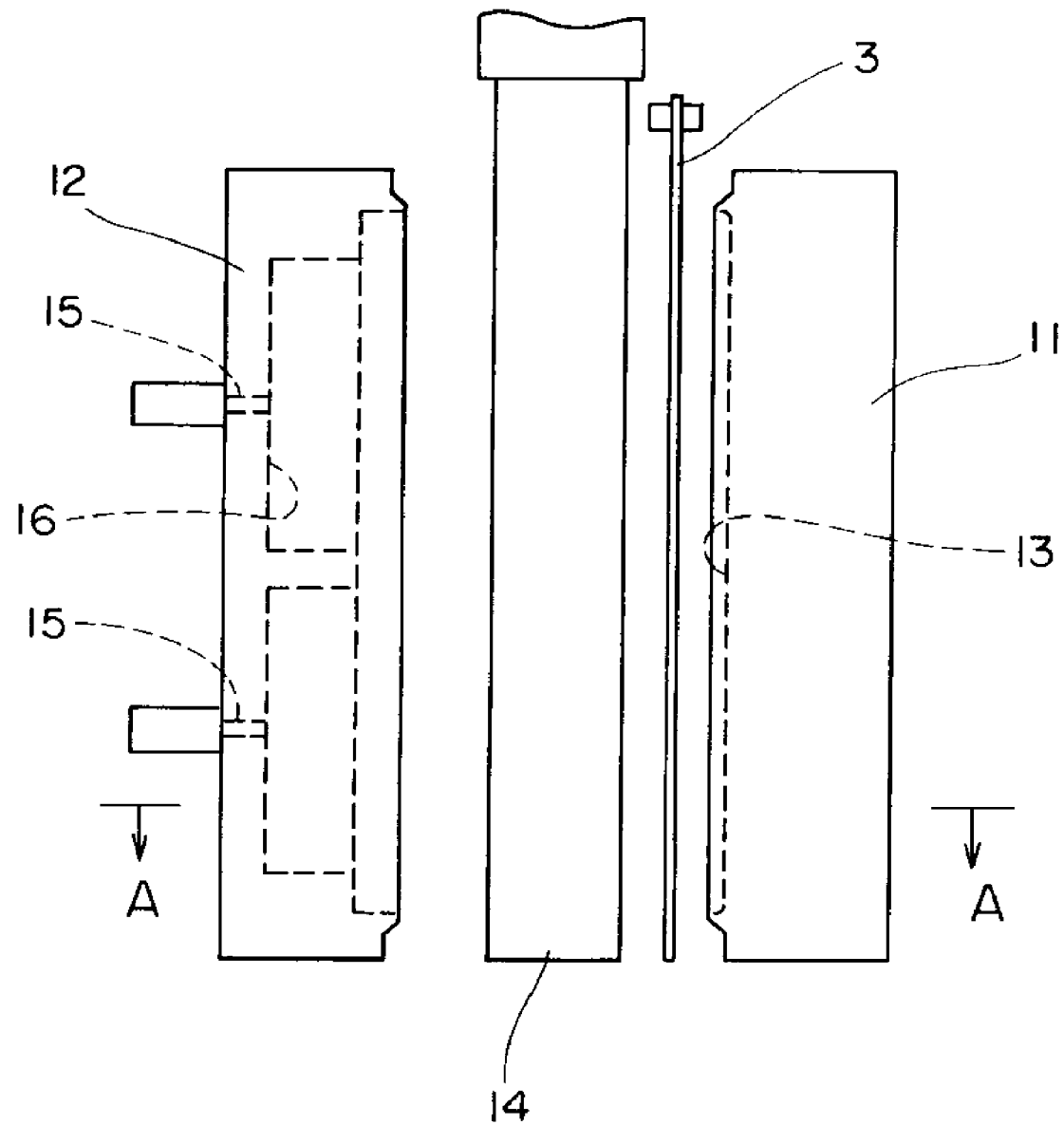
FIG. 2 is a side view of a die, indicating a blow molding embodiment of the panel with the cover indicated in FIG. 1.
Figure 3:
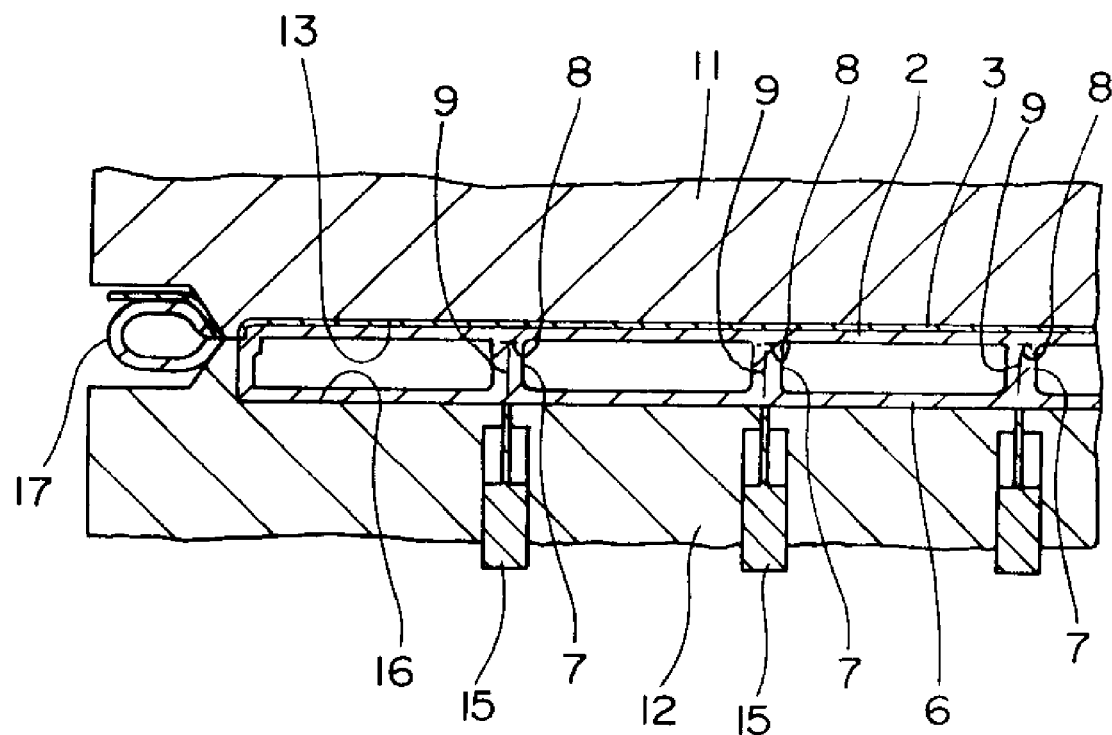
FIG. 3 is an enlarged sectional view in the arrow direction taken along the line A-A of FIG. 2.
Figure 4:
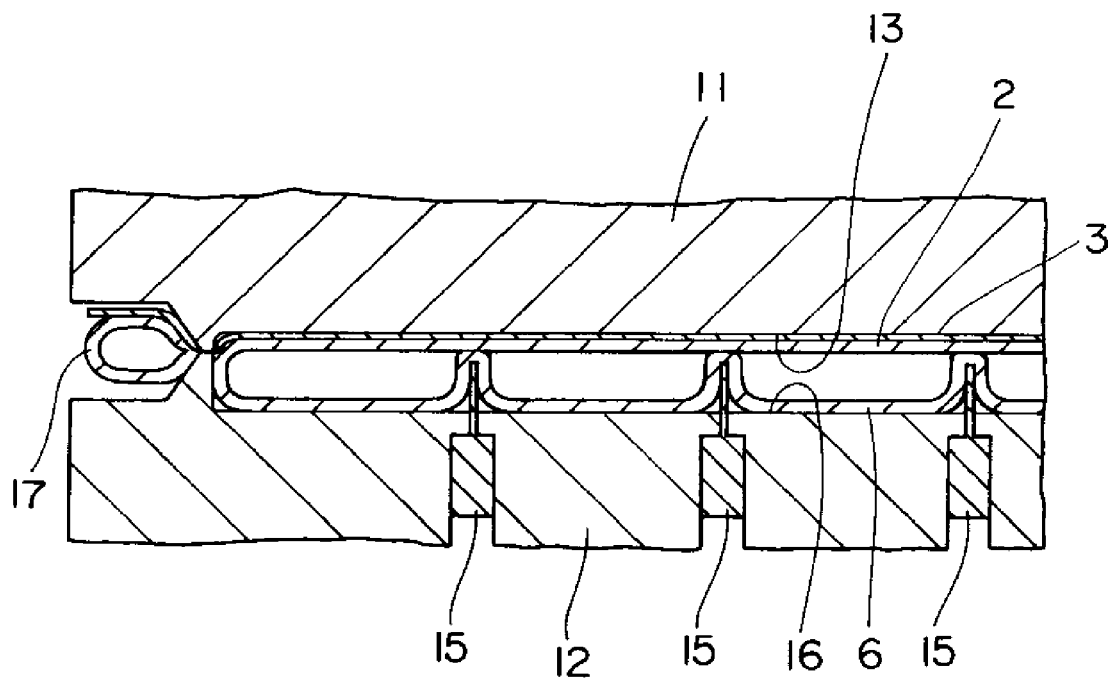
FIG. 4 is an enlarged sectional view in the arrow direction taken along the line A-A of FIG. 2, and indicates a state in which a slide core disposed within the die is retracted.

Next, a method of manufacturing the panel 1 with the cover will be described. The panel 1 with the cover of one embodiment of the present invention is manufactured by blow molding thermoplastic plastics as illustrated in FIGS. 2 to 4. In these drawings, reference numerals 11 and 12 are a pair of separated dies. The cover material 3 of cloth having fuzzy hairs or flocking in the outer direction is placed between the cavity 13 of the one die and a parison 14 in such a manner that the fuzzy hairs faces the side of the cavity 13. In the other die 12, a slide core 15 for protrusion forming the inner rib 7 to the other wall 6 of the panel 1 is provided to be put out and in relative to the cavity 16. The pair of separated dies 11, 12 is swaged from the state of FIG. 2 to blow mold the panel 1 by means of the pair of separated dies 11, 12 constructed as described above. At this time, the parison 14 has its inside be pinched in a closed fashion via a pinch-off portion formed around the cavities 13, 16, and also the cover material 3 intervenes between a part to be the one wall 2 of the parison 14 and the cavity 13. Then, as shown in FIG. 3, the slide core 15 is made to advance toward the cavity 16 until a portion of a part to be the other wall 6 of the parison 14 is made to extend to touch with a portion to be the one wall 2 of the parison 14, and the top end face 8 thereof is welded to the part to be the one wall 2 of the parison 14. Subsequently, the slide core 15 is made to retract in a short time (within 10 seconds, preferably within 5 seconds) until the tip of the slide core 15 becomes the same position as the face of the cavity 16 in such a way that the fuzzy hairs of the cover material 3 do not fall, and while keeping the conditions, a pressured fluid is introduced into the parison 14. At this time, the pressured fluid increases the pressure within the parison 14 to crimp the parison 14 toward cavities 13, 16. The part to be the one wall 2 of the parison 14 is thrust against the cover material 3 by this pressure, and the cover material 3 has its face not having the fuzzy hairs heat welded on the one wall 2. In addition, a protruded part of the part to be the other wall 6 of the parison 14 has its both sides thrust to each other to be integrally welded to form the inner rib 7. However, the inner rib 7, as shown in FIG. 4, has both side faces of its protruded wall integrally welded to each other, and also the top end face 8 is welded to the one wall 2. In FIGS. 3 and 4, reference numeral 17 is a fin.

Characteristics of the panel 1 with the cover will be set forth hereinafter. As described above, the cover material 3 is integrally heat welded on the outer surface of the one wall 2 via blow pressure during blow molding, and the blow pressure is till 10 Kg/cm$^2$. As a result, the cover material 3 is not so strongly thrust, and thus, the cover material 3 is not distorted. Hence, even if the cover material 3 is cloth having fuzzy hairs or flocking in the outer direction, compression of the knap of the covering or the fall of fuzzy hairs is not caused by blow pressure, whereby the cover material 3 keeps its whole in good conditions. In addition, the inner rib 7 formed in the part of the other wall 6 causes the slide core 15 to advance toward the cavity 16. The time of the portion of the part to be the other wall 6 of the parison 14 to touch with the part to be the one wall 2 is completed in a short time so as not to render the fall of the fuzzy hairs. Then, the slide core 15 is retracted, and thus, the part of the top end face 8 of the inner rib 7 to be integrally welded is substantially not thrust. For this reason, in the cover material 3 integrally heat welded on the outer surface of the one wall 2 does not partially appear thrust marks by formation of the inner rib 7 as described above. Even though the cover material 3 is cloth having fuzzy hairs in the outer direction, the fuzzy hairs do not partially fall nor are the compressed, whereby a product with an improved appearance is obtained. The inner rib 7 is present between the one wall 2 and the other wall 6, and is a wall that is bridged across the hollow space 5 to form the welded portion 9 of a side face having welded thereon two sheets of the parison 14 and integrally connected. Thus, the inner rib is not only excellent in strength such as rigidity, but does no have a concave like a general rib, so that both the one wall 2 and the other wall 6 are planar faces.

Next, the cover material 3 will be set forth. Cloth having flocking, carpeting, a knap, or fuzzy hairs outward, that is the cover material 3, includes natural fibers such as cotton, hemp, wool and silk, recycled fibers such as viscose rayon and copper ammonia rayon, semi-synthetic fibers such as acetate and rayon, synthetic fibers such as nylon, polyester, acryl, vinylon, polypropylene and polyurethane, and cloth produced by raising or shearing knitted fabric, woven fabric and unwoven fabric obtained by processing blend fibers thereof. The cloth has fuzzy hairs in conditions raised in one direction, a direction perpendicular to a spread direction of the cloth.

In the above embodiment, the panel 1 with the cover is made by placing the parison 14 and the cover material 3 between the separated dies 11 and 12, and heat welding the cover material 3 on the outer surface of the one wall 2 at the same time during blow welding. In addition, although the panel is made by molding the inner rib 7 in the other wall 6 for reinforcement toward the other wall and integrally welding its top end face to the other wall 2, thrust marks do not appear on the cover material 3 that has been heat welded on the outer surface of the one wall 2. Further, even cloth having fuzzy hairs outward of the cover material 3 does not cause a partial fall of fuzzy hairs, so that the appearance is excellent. Moreover, according to a manufacturing method of one embodiment of the present invention, thrust marks do not appear on the cover material 3 that has been heat welded on the outer surface of the one wall 2, and even cloth having flocking or fuzzy hairs outward of the cover material does not cause a partial fall of flocking or fuzzy hairs, so that the panel 1 with the cover excellent in appearance can be manufactured. Although the above cover material 3 indicated has raised flocking, carpeting, fur or fuzzy hairs, one embodiment of the present invention can also stick a cover material 3 made from a sheet or film of raised fuzzy hairs-free synthetic resin, thermoplastic elastomer, rubber, paper, or the like, depending on design, applications or other purposes. Means for sticking can include, in addition to the means for molding and sticking at the same time of blow molding within a die for blow molding as indicated above, a method including blow molding a panel and then sticking a cover material by use of machinery such as robot or by means of handwork.

Figure 5:
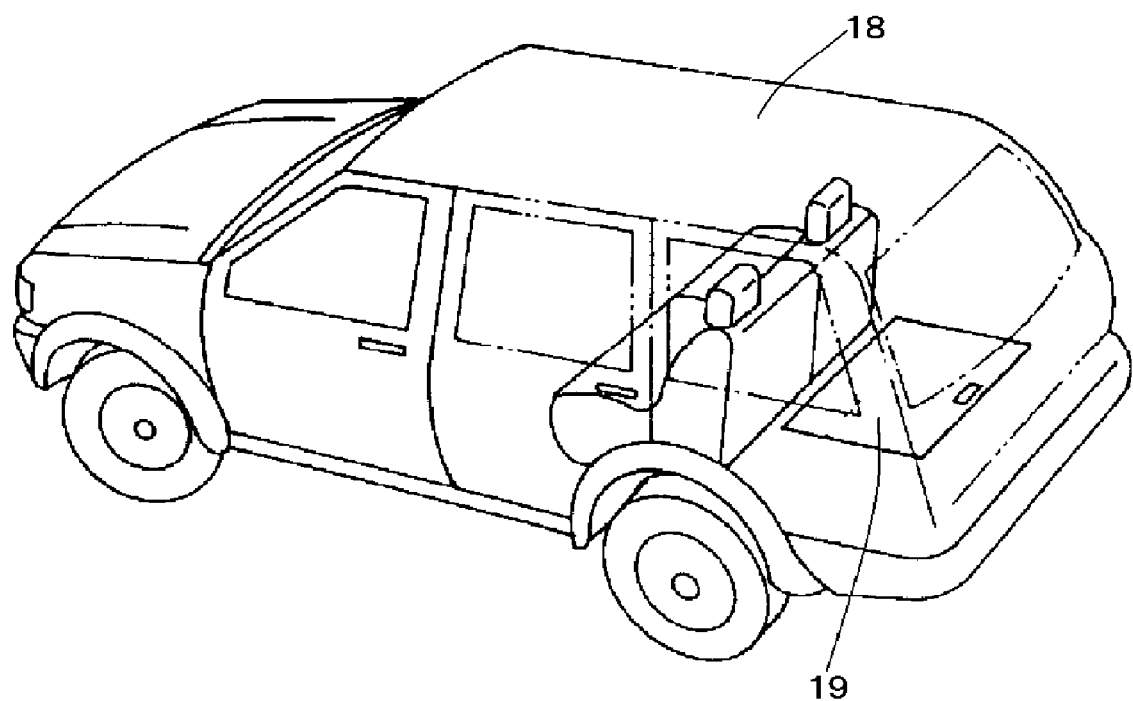
FIG. 5 is an entire perspective view of an automobile indicating a state in which the panel with the cover of one embodiment of the present invention is used as a deck board for the automobile.
Figure 6:
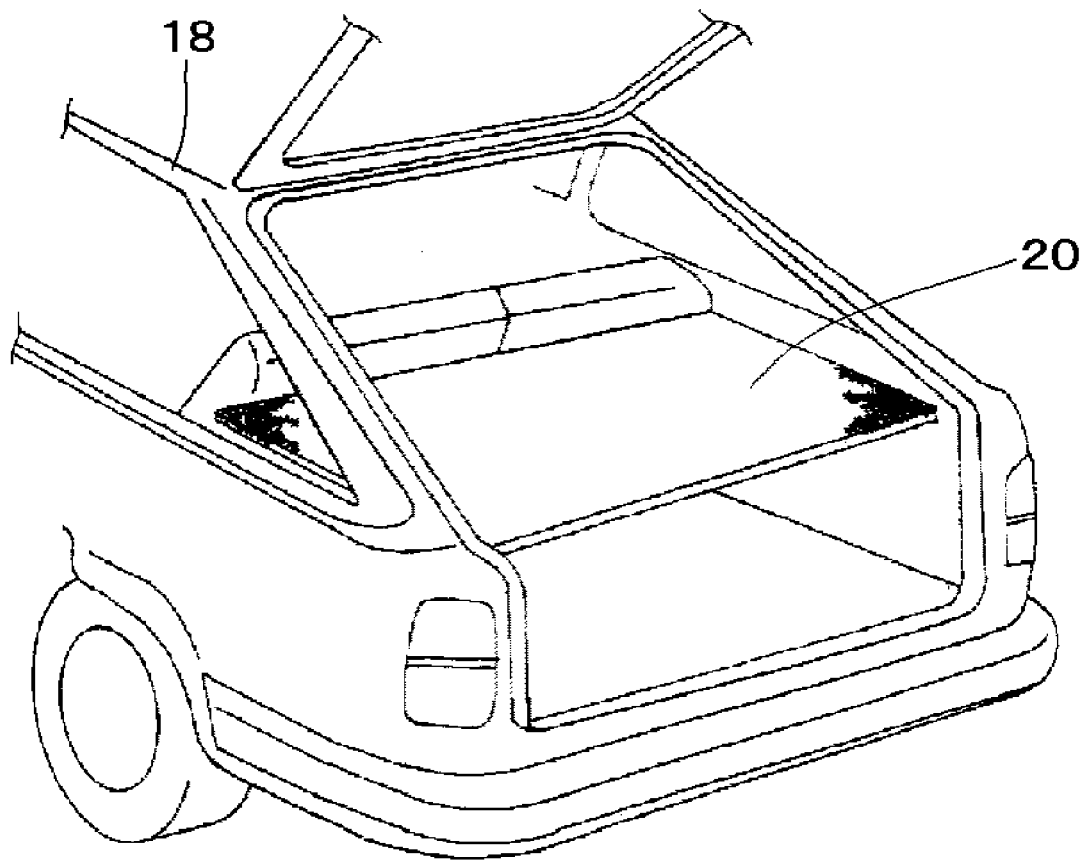
FIG. 6 is an entire perspective view of an automobile indicating a state in which the panel with the cover of one embodiment of the present invention is used as a luggage board for the automobile.

In FIGS. 5 and 6, aspects are illustrated that use the panel 1 with the cover of being one example of the blow molded panel according to one embodiment of the present invention as deck boards of an automobile (such as floor lids and luggage boards). FIG. 5 indicates an aspect that uses the panel as a floor lid 19, FIG. 6 as a luggage board 20.

Figure 7:
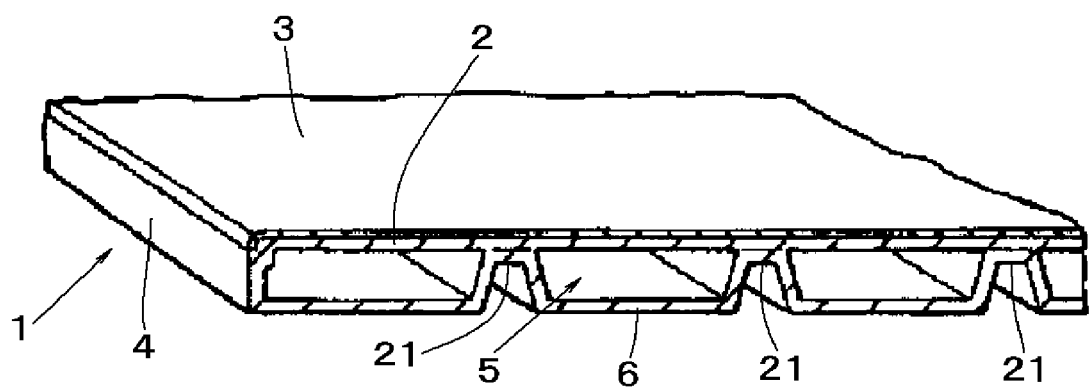
FIG. 7 is a partial perspective view indicating another construction of the panel according to one embodiment of the present invention.

Additionally, FIG. 7 illustrates a blow molded panel according to another embodiment of the present invention, i.e., a panel 1 with a cover. The panel 1 with the cover has the same configuration as that indicated in FIG. 1 except that a concave rib 21 is formed from the other wall 6 to the one wall 2. Therefore, the same constituents are indicated by the same reference numerals, and the descriptions are omitted.

In one such embodiment, a deck board with a cover of an automobile as indicated in FIG. 5 was molded by extrusion blow molding. The wall face of the molded deck board (back face without the stuck skin, i.e., wall face of a part free of the inner rib) was partially cut to take off a resin strip, which was measured for various characteristics. The deck board had a length of 800 mm, a width of 1000 mm, and a thickness of 20 mm, and a plurality of inner ribs extended along the width had an interval of 20 mm there between. The manufacturing method used the method indicated in the above experimental example. Resin materials used are indicated in Tables 1 and 2, and the resin materials were, as appropriate, combined. The samples indicated in Examples, Comparative Examples, and Reference Examples in Tables 3 to 6 were evaluated. At the time of measurement of each example, 5 specimens were evaluated and their average values were indicated in Tables as evaluation results. Tables 3 and 4 indicate evaluation results for specimens without mixing of fillers at room and low temperatures; Table 5 indicates evaluation results for specimens with mixing of fillers at room and low temperatures; and Tables 6 indicates evaluation results for specimens without mixing of fillers at a high temperature. The deck boards obtained in Examples gave excellent balance between load resistance and impact resistance (particularly, low temperature impact properties), and were excellent in heat resistance and beauty.

Tensile Break Elongation

TABLE 1

| | Characteristics of Polypropylene | | | | |
|---|---|---|---|---|---|
| Items | Unit | PP1 | PP2 | PP3 | PP4 |
| MFR (210° C.) | g/10 min | 0.29 | 0.28 | 0.35 | 0.27 |
| MFR ratio | — | 126 | 107 | 111 | 161 |
| Ethylene content | Weight % | 5.7 | 8.5 | 2.5 | 0 |
| Melting point | ° C. | 163 | 167 | 163 | 160 |
| MT (210° C.) | g | 5.0 | 5.3 | 3.8 | 7.0 |
| MTV (") | m/min | 78.5< | 78.5< | 78.5< | 78.5< |
| Tensional physical properties | | | | | |
| 23° C. Test strip thickness | mm | 2.2 | 2.1 | 2.0 | 2.1 |
| Tensile yield strength | kgf/cm² | 270 | 230 | 280 | 400 |

TABLE 1-continued

Characteristics of Polypropylene

| | Items | Unit | PP1 | PP2 | PP3 | PP4 |
|---|---|---|---|---|---|---|
| | Tensile break strength | kgf/cm² | 380 | 340 | 410 | 300 |
| | Tensile break elongation | % | 1,460 | 1,230 | 1,400 | 14 |
| −30° C. | Test strip thickness | mm | 2.3 | 2.1 | 2.0 | 2.1 |
| | Tensile yield strength | kgf/cm² | 490 | 410 | 520 | 730 |
| | Tensile break strength | kgf/cm² | 290 | 300 | 240 | 730 |
| | Tensile break elongation | % | 12 | 350 | 19 | 6 |

TABLE 2

Characteristics of Polyethylene

| | Items | Unit | HD1 | HD2 | HD3 |
|---|---|---|---|---|---|
| | MFR (210° C.) | g/10 min | 0.34 | 0.56 | 0.55 |
| | MFR ratio | — | 121 | 66 | 54 |
| | Ethylene content | Weight % | 0.956 | 0.954 | 0.960 |
| | Melting point | ° C. | 135 | 133 | 137 |
| | MT (210° C.) | g | 8.4 | 6.9 | 4.5 |
| | MTV (210° C.) | m/min | 22.8 | 38.5 | 46.0 |
| | Tensional physical properties | | | | |
| 23° C. | Test strip thickness | mm | 2.2 | 2.0 | 1.9 |
| | Tensile yield strength | kgf/cm² | 270 | 260 | 300 |
| | Tensile break strength | kgf/cm² | 180 | 110 | 210 |
| | Tensile break elongation | % | 880 | 790 | 1,090 |
| −30° C. | Test strip thickness | mm | 2.2 | 2.0 | 1.9 |
| | Tensile yield strength | kgf/cm² | 400 | 430 | 390 |
| | Tensile break strength | kgf/cm² | 250 | 290 | 270 |
| | Tensile break elongation | % | 31 | 37 | 51 |

TABLE 3

(Evaluation of Physical Properties of Test Strips at Room Temperature [23° C.] and [−30° C.]): No. 1 (Without Mixing of Filler)

| | Material Composition | MFR ratio | Thickness (tensile) mm | Yield strength kg/cm² | Break strength kg/cm² | Break elongation % GL |
|---|---|---|---|---|---|---|
| Reference Example | PP2/HD3 (100/0) | 107 | 2.1 | 230 | 340 | 1,230 |
| | | | 2.1 | 420 | 300 | 350 |
| Example 1 | PP2/HD3 (70/30) | 134 | 2.3 | 250 | 410 | 1,560 |
| | | | 2.4 | 390 | 400 | 540 |
| Example 1 | PP2/HD3 (50/50) | 121 | 2.4 | 260 | 360 | 1,570 |
| | | | 2.4 | 420 | 350 | 790 |
| Example 2 | PP2/HD3 (30/70) | 98 | 2.3 | 270 | 370 | 1,750 |
| | | | 2.3 | 410 | 410 | 750 |
| Reference Example | PP2/HD3 (0/100) | 54 | 1.9 | 300 | 210 | 1,090 |
| | | | 1.9 | 390 | 270 | 51 |

Tensional physical properties (Upper row 23° C., Lower row −30° C.)

TABLE 4

(Evaluation of Physical Properties of Test Strips at Room Temperature [23° C.] and [−30° C.]): No. 1 (Without Mixing of Filler)

| | Material Composition | Thickness (tensile) mm | Yield strength kg/cm² | Break strength kg/cm² | Break elongation % GL |
|---|---|---|---|---|---|
| Reference Example | PP3/HD3 (100/0) | 2.0 | 280 | 410 | 1,400 |
| Comparative Example 1 | PP3/HD3 (80/20) | 2.3 | 280 | 190 | 860 |
| Comparative Example 2 | PP3/HD3 (70/30) | 2.4 | 280 | 180 | 270 |

Tensional physical properties (Upper row 23° C., Lower row −30° C.)

TABLE 4-continued (Evaluation of Physical Properties of Test Strips at Room Temperature [23° C.] and [−30° C.]): No. 1 (Without Mixing of Filler)

| | Material Composition | Thickness (tensile) mm | Yield strength kg/cm² | Break strength kg/cm² | Break elongation % GL |
|---|---|---|---|---|---|
| | | | Tensional physical properties (Upper row 23° C., Lower row −30° C.) | | |
| Comparative Example 3 | PP3/HD3 (60/40) | 2.4 | 290 | 140 | 110 |
| Comparative Example 4 | PP3/HD3 (50/50) | 2.3 | 170 | 290 | 11 |
| Comparative Example 5 | PP3/HD3 (40/60) | 2.3 | 300 | 180 | 83 |
| Comparative Example 6 | PP3/HD3 (30/70) | 2.2 | 300 | 170 | 220 |
| Comparative Example 7 | PP3/HD3 (20/80) | 2.1 | 300 | 170 | 210 |
| Reference Example | PP3/HD3 (0/100) | 1.9 | 300 | 210 | 1,090 |
| Example 4 | PP2/HD2 (70/30) | 2.5 | 250 | 340 | 1,480 |
| | | 1.9 | 450 | 320 | 390 |
| Example 5 | PP2/HD2 (50/50) | 2.5 | 250 | 400 | 1530 |
| Comparative Example 8 | PP1/HD1(70/30) | 2.4 | 291 | 210 | 730 |
| Comparative Example 9 | PP1/HD1(30/70) | 2.4 | 278 | 167 | 250 |
| Comparative Example 10 | PP3/HD2(70/30) | 2.2 | 260 | 180 | 470 |
| | | 2.1 | 460 | 290 | 49 |
| Comparative Example 11 | PP1/PP4/HD1 (40/50/10) | 2.2 | 310 | 210 | 770 |
| Example 6 | PP2/PP4/HD1(50/20/30) | 23 | 280 | 370 | 1470 |

TABLE 5

(Evaluation of Physical Properties of Test Strips at Room Temperature [23° C.] and [−30° C.]): No. 3 (With mixing of filler)

| | Material Composition | | Thickness (tensile) mm | Yield strength kg/cm² | Break strength kg/cm² | Break elongation % GL | Elastic modulus kg/cm² |
|---|---|---|---|---|---|---|---|
| | Resin Article name/weight % | Talc | | Tensional physical properties (Upper row 23° C., Lower row −30° C.) | | | |
| Example 7 | PP2/HD3(63/27) | F1/10 | 2.2 | 270 | 300 | 1,150 | 1,0200 |
| | | | 2.2 | 450 | 320 | 36 | 1,9360 |
| Example 8 | PP2/HD3(56/24) | F1/20 | 2.0 | 260 | 210 | 710 | 1,2200 |
| | | | 2.1 | 470 | 420 | 25 | 1,9420 |
| Example 9 | PP2/HD3(49/21) | F1/30 | 1.9 | 260 | 200 | 590 | 1,3800 |
| | | | 1.9 | 460 | 420 | 21 | 2,2180 |
| Comparative Example 11 | PP1/85 | FI/15 | 1.9 | 280 | 210 | 660 | 9,155 |
| | | | 1.8 | 460 | 410 | 7 | 2,1780 |

(Note)
Talc: manufactured by White Calcium Co., Ltd. (Trade name: MAT805T)

TABLE 6

(Evaluation of Physical Properties of Test Strips at High Temperature [80° C.])

| | Thickness (tensile) mm | Yield strength kg/cm² | Break strength kg/cm² | Break elongation % GL | Tensile elastic modulus kg/cm² |
|---|---|---|---|---|---|
| PP2/HD3(70/30) | 2.27 | 115 | 85< | 481< | 2,910 |
| PP2/HD3(50/50) | 2.44 | 111 | 78< | 485< | 2,628 |
| PP2/HD3(30/70) | 2.23 | 112 | 77< | 483< | 2,714 |
| PP1/HD1(70/30) | 2.28 | 124 | 97< | 482< | 2,872 |
| PP1/PP4/HD1(40/50/10) | 2.22 | 141 | 100< | 483< | 3,468 |
| PP4/PP2/HD3(20/50/30) | 2.29 | 129 | 91< | 484< | 3,016 |

One embodiment of the present invention can be utilized in a blow molded article excellent in rigidity and impact resistance as well as in drop impact properties at low temperatures.

Blow molded articles manufactured by one embodiment of the present invention include blow molded articles such as panels, housing members, talc, ducts and bottles, and are useful as structures requiring rigidity in particular.

One embodiment of the present invention can be utilized as a blow molded panel, and for example, is a planar structure of a hollow double-walled structure or a single-walled structure. One embodiment of the invention is useful in (1) members for use in the interior of an automobile, e.g., deck boards (such as floor lids and luggage boards), seat backs, door panels and side housing covers, (2) members for use in housing of electronic (electrical) appliances such as copying machines, e.g., doors of copying machines, and sorter covers, (3) wall materials, shelf boards, doors of washstands, top boards of desks and bath aprons of bathes for use in installed properties of a building, house and office. In particular, a blow molded panel is useful that is excellent in rigidity and impact resistance as well as is a structure for an automobile having a hollow double-walled structure in which drop impact properties at low temperatures are required.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A blow molded panel comprising:
    a resin composition for blow molding, said resin comprising:
        0 to 30 weight parts of an inorganic filler based on 100 weight parts of a resin composition, said resin composition comprising a blend of polypropylene resin and high density polyethylene resin comprised of: 20 to 95% by weight of said polypropylene resin, said resin composition having a Melt Flow Rate of 0.05-2, said polypropylene resin having a melting point evaluated by a differential scanning calorimeter (DSC) of 160° C. or higher and a tensile break elongation measured at −30° C. of not less than 50%, the polypropylene resin being comprised of a propylene-ethylene block copolymer having an ethylene content of 6 to 15% by weight; and 5 to 80% by weight of high density polyethylene resin having a melting point evaluated by a differential scanning calorimeter (DSC) of 130° C. or higher,
    said polypropylene resin having a ratio (MFR ratio) obtained by dividing a melt flow rate determined at a temperature of 210° C. under a load of 211.8N by a melt flow rate determined at a temperature of 210° C. under a load of 21.18N is 120 or less; and
    said resin composition having a tensile break strength is 250 Kg/cm$^2$ or more at ambient temperature, and the tensile break elongation is 500% or more
    said resin composition being formed into said blow molded panel.

2. A blow molded panel, comprising:
    20 to 95% by weight of polypropylene resin having a melting point evaluated by a differential scanning calorimeter (DSC) of 160° C. or higher said polypropylene resin having a ratio (MFR ratio) obtained by dividing a melt flow rate determined at a temperature of 210° C. under a load of 211.8N by a melt flow rate determined at a temperature of 210° C. under a load of 21.18N is 120 or less; and a tensile break elongation measured at −30° C. of not less than 50%, the polypropylene resin being comprised of a propylene-ethylene block copolymer having an ethylene content of 3 to 15% by weight; and
    5 to 80% by weight of polyethylene resin having a melting point evaluated by a differential scanning calorimeter (DSC) of 130° C. or higher and a melt flow rate of 0.2 to 10, wherein
    the resin composition has a tensile break strength of 250 Kg/cm$^2$ or more at ambient temperature, and a tensile break elongation of 500% or more, and
    the composition is made by formulating 6 to 50 weight parts of an inorganic filler based on 100 weight parts of a resin composition having a tensile break elongation determined at −30° C. of 50% or more;
    said resin composition having a melt flow rate of 0.05-2; and
    said resin composition being formed into said blow molded panel.

3. The blow molded panel according to claim 1, wherein, in the polyethylene resin, a ratio (MFR ratio) obtained by dividing a melt flow rate determined at a temperature of 190° C. under a load of 211.8N by a melt flow rate determined at a temperature of 190° C. under a load of 21.18N is 80 or less.

4. The blow molded panel according to claim 1 wherein said blow molded panel comprises a hollow double-walled structure.

5. The blow molded panel according to claim 1, wherein said blow molded panel is produced by melting, extruding, and blow molding the resin composition, the blow molded panel having a hollow double-walled structure produced by compression welding the peripherals of a pair of opposed and separated surface walls by means of a die, wherein
    at least one of the surface walls is protruded to a hollow space of the structure and ribs are integrally molded.

6. An automobile floor panel constituted by the blow molded panel of the hollow double-walled structure according to claim 5.

7. The blow molded panel comprising the resin composition for blow molding according to claim 2, wherein the tensile break elongation determined at −30° C. of the polypropylene resin is 50% or more.

8. The blow molded panel comprising the resin composition for blow molding according to claim 2, wherein, in the polypropylene resin, a ratio (MFR ratio) obtained by dividing a melt flow rate determined at a temperature of 190° C. under a load of 211.8N by a melt flow rate determined at a temperature of 190° C. under a load of 21.18N is 120 or less.

9. The blow molded panel comprising the resin composition for blow molding according to claim 2, wherein, in the polyethylene resin, a ratio (MFR ratio) obtained by dividing a melt flow rate determined at a temperature of 190° C. under a load of 211.8N by a melt flow rate determined at a temperature of 190° C. under a load of 21.18N is 80 or less.

10. The blow molded panel according to claim 2 wherein said blow molded panel comprises a hollow double-walled structure.

11. The blow molded panel according to claim 2, wherein said blow molded panel is produced by melting, extruding, and blow molding the resin composition, the blow molded panel having a hollow double-walled structure produced by compression welding the peripherals of a pair of opposed and separated surface walls by means of a die, wherein
    at least one of the surface walls is protruded to a hollow space of the structure and ribs are integrally molded.

12. An automobile deck board constituted by the blow molded panel of the hollow double-walled structure according to claim 11 wherein said deck board is selected from the group of deck boards consisting of floor lids and floor panels.

* * * * *